(12) United States Patent
Hodgson et al.

(10) Patent No.: US 9,261,000 B2
(45) Date of Patent: Feb. 16, 2016

(54) DEVICE FOR EXHAUST-GAS AFTERTREATMENT HAVING A DOSING UNIT FOR AN EXHAUST-GAS AFTERTREATMENT AGENT AND MOTOR VEHICLE HAVING THE DEVICE

(71) Applicant: EMITEC GESELLSCHAFT FUER EMISSIONSTECHNOLOGIE MBH, Lohmar (DE)

(72) Inventors: Jan Hodgson, Troisdorf (DE); Sven Schepers, Troisdorf (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 14/311,554

(22) Filed: Jun. 23, 2014

(65) Prior Publication Data

US 2014/0298780 A1     Oct. 9, 2014

Related U.S. Application Data

(63) Continuation of application No. PCT/EP2012/076333, filed on Dec. 20, 2012.

(30) Foreign Application Priority Data

Dec. 23, 2011   (DE) .......................... 10 2011 122 286

(51) Int. Cl.
*F01N 3/00*      (2006.01)
*F01N 3/20*      (2006.01)

(52) U.S. Cl.
CPC ............ *F01N 3/2046* (2013.01); *F01N 3/2066* (2013.01); *F01N 2610/11* (2013.01); *F01N 2610/1453* (2013.01); *Y02T 10/24* (2013.01)

(58) Field of Classification Search
CPC . F01N 3/2066; F01N 3/2046; F01N 2610/11; F01N 2610/1453; Y02T 10/24
USPC ............................................. 60/298; 422/173
See application file for complete search history.

(56) References Cited

U.S. PATENT DOCUMENTS

| 8,622,316 | B2 | 1/2014 | Haeberer et al. |
| 2010/0320285 | A1* | 12/2010 | Haeberer et al. ............. 239/132 |
| 2012/0110990 | A1 | 5/2012 | Stein et al. |

FOREIGN PATENT DOCUMENTS

| DE | 102006053804 A1 | 5/2008 |
| DE | 102006061730 A1 | 7/2008 |

(Continued)

OTHER PUBLICATIONS

English translation of German Patent Application Publication No. DE 102008055190 A1 (Jul. 2009).*

*Primary Examiner* — Jason Shanske
(74) *Attorney, Agent, or Firm* — Laurence A. Greenberg; Werner H. Stemer; Ralph E. Locher

(57) ABSTRACT

A device for the aftertreatment of an exhaust gas of an internal combustion engine flowing through an exhaust line includes at least one dosing unit disposed in an opening of an exhaust pipe of the exhaust line and configured to add an exhaust-gas aftertreatment agent into the exhaust line. The dosing unit is enclosed by a cooling jacket, through which the dosing unit is fastened in the opening of the exhaust pipe. The cooling jacket is at least partially enclosed by a space or chamber delimited at least by the cooling jacket, the exhaust pipe, and a cover plate. The cover plate is connected to the exhaust pipe and spaced apart from the cooling jacket or the dosing unit by a gap. A motor vehicle having the device is also provided.

8 Claims, 2 Drawing Sheets

(56) References Cited

FOREIGN PATENT DOCUMENTS

| DE | 102008055190 | A1 | 7/2009 |
|---|---|---|---|
| DE | 102008040476 | A1 | 2/2010 |
| DE | 102009027181 | A1 | 12/2010 |
| DE | 102009027724 | A1 | 1/2011 |
| DE | 102009028030 | A1 | 2/2011 |
| JP | 2009174485 | A | 8/2009 |
| WO | 2005005799 | A1 | 1/2005 |

* cited by examiner

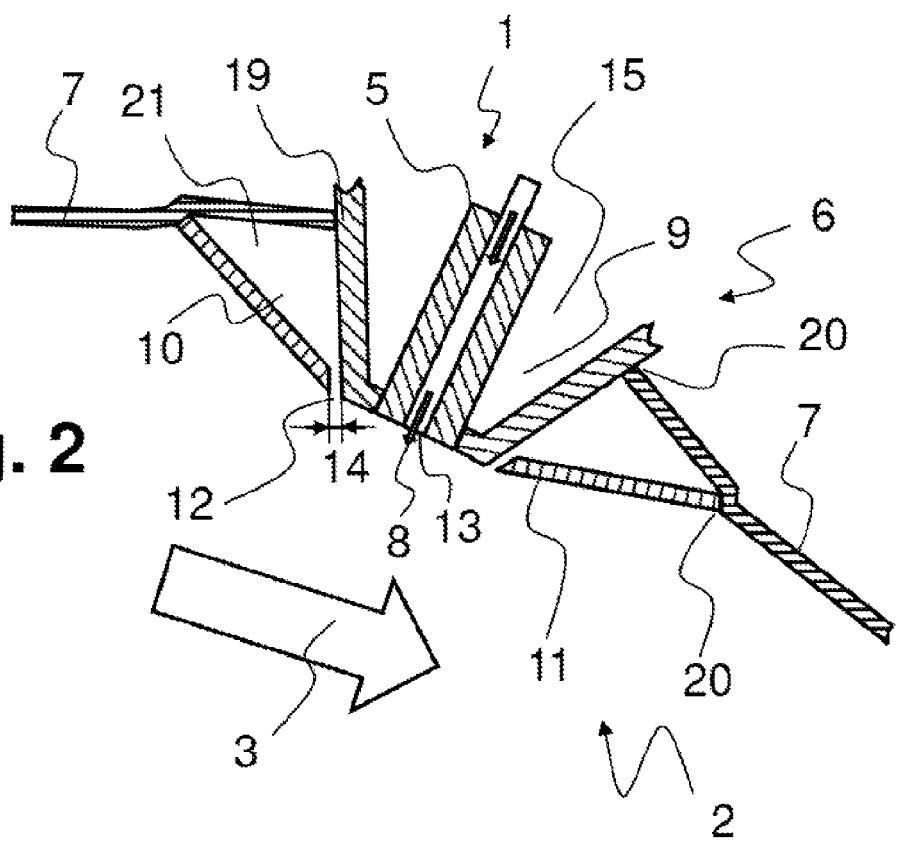
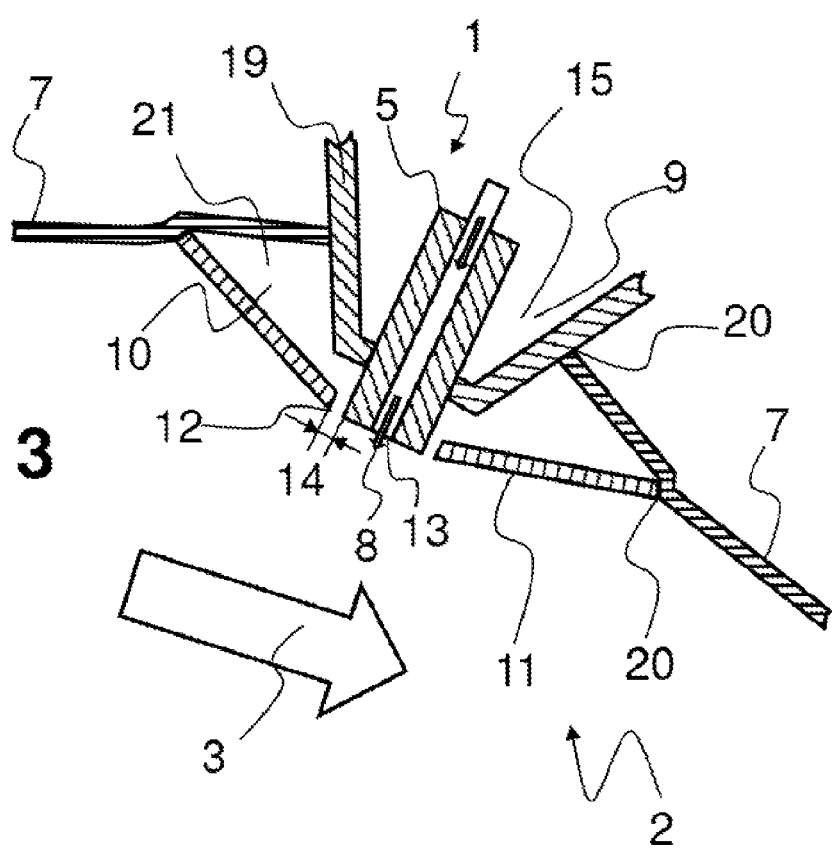

DEVICE FOR EXHAUST-GAS AFTERTREATMENT HAVING A DOSING UNIT FOR AN EXHAUST-GAS AFTERTREATMENT AGENT AND MOTOR VEHICLE HAVING THE DEVICE

CROSS-REFERENCE TO RELATED APPLICATION

This is a continuation, under 35 U.S.C. §120, of copending International Application No. PCT/EP2012/076333, filed Dec. 20, 2012, which designated the United States; this application also claims the priority, under 35 U.S.C. §119, of German Patent Application DE 10 2011 122 286.7, filed Dec. 23, 2011; the prior applications are herewith incorporated by reference in their entirety.

BACKGROUND OF THE INVENTION

Field of the Invention

The present invention relates to a device for the aftertreatment of an exhaust gas of an internal combustion engine flowing through an exhaust line, including a dosing unit for metering an exhaust-gas aftertreatment agent into the exhaust line. The invention also relates to a motor vehicle having the device.

In exhaust-gas aftertreatment devices for the purification of the exhaust gases of (mobile) internal combustion engines, increasing use is being made of exhaust-gas treatment devices in which the exhaust gas of the internal combustion engine is purified with the aid of an exhaust-gas aftertreatment agent supplied to the exhaust gas. Mobile internal combustion engines are used, for example, for driving motor vehicles.

A known method, among others, is that of selective catalytic reduction (SCR) in which the exhaust gases of an internal combustion engine are purified of nitrogen oxide compounds. In that case, an exhaust-gas aftertreatment agent that reduces nitrogen oxide compounds is supplied to the exhaust gas. An exhaust-gas aftertreatment agent of that type is, for example, ammonia. Ammonia is normally not stored in motor vehicles directly but rather in the form of a (liquid or solid) precursor medium, which is also referred to as a reducing agent precursor. The reducing agent precursor is subsequently converted, in a dedicated reactor that is provided or in the exhaust-gas aftertreatment device, to form ammonia, the actual reducing agent. Such a reducing agent precursor is, for example, a urea-water solution which is available under the trademark AdBlue®. Such a reducing agent precursor solution does not pose a health hazard and can therefore be stored without problems. In particular, the reducing agents and reducing agent precursors mentioned herein will hereinafter be referred to collectively by the expression "exhaust-gas aftertreatment agent."

The exhaust-gas aftertreatment agent is supplied to the exhaust line by using a dosing unit, with which the exhaust-gas aftertreatment agent is supplied in liquid or gaseous form and also mixed with carrier gases. The dosing unit may be passively and/or actively actuated. The dosing unit may include a valve, an injector, a dosing pump or the like.

The exhaust gas flowing through the exhaust line can reach very high temperatures, and therefore high demands are placed on the dosing unit and also on the exhaust-gas aftertreatment agent with regard to durability and stability. In order to protect the dosing unit against such high temperatures, a device for (actively) cooling the dosing unit may be provided, for example in the form of a water-type cooling configuration. Due to the turbulence in the exhaust line, a situation may furthermore arise in which exhaust-gas aftertreatment agent that is supplied precipitates on an (intermittently) cooled, that is to say relatively cold, surface of the dosing unit. It may happen in that case (in the event of a slight increase in temperature, for example, in the range from 70 to 100° C.) that deposits form which can only be removed with difficulty, and which can result in the flow conditions for the exhaust-gas aftertreatment agent through the dosing unit being influenced. Furthermore, the dosing unit may become successively blocked by the deposits. Additionally, due to the high temperature gradient between the cooling configuration of the dosing unit and the exhaust-gas-conducting exhaust line, material fatigue (for example of the exhaust line) may occur, in particular in the region of the connection of the exhaust line to the dosing unit.

SUMMARY OF THE INVENTION

It is accordingly an object of the invention to provide a device for exhaust-gas aftertreatment having a dosing unit for an exhaust-gas aftertreatment agent and a motor vehicle having the device, which overcome the hereinafore-mentioned disadvantages and at least partially solve the highlighted technical problems of the heretofore-known devices and methods of this general type. In particular, it is sought to propose a particularly inexpensive, technically simple and effective device with which a temperature loading of a connection between an exhaust line and a dosing unit can be reduced, and/or deposits of the exhaust-gas aftertreatment agent can be prevented from forming in the region of the dosing unit.

With the foregoing and other objects in view there is provided, in accordance with the invention, a device for the aftertreatment of an exhaust gas, flowing through an exhaust line, of an internal combustion engine. The device includes a dosing unit which is disposed in an opening of an exhaust pipe of the exhaust line and which is constructed for the metering of an exhaust-gas aftertreatment agent into the exhaust line. The dosing unit is surrounded by a cooling jacket by way of which the dosing unit is fixed in the opening of the exhaust pipe. The cooling jacket is at least partially surrounded by a space which is delimited at least by the cooling jacket, by the exhaust pipe and by a covering plate. The covering plate is connected to the exhaust pipe and is spaced apart from the cooling jacket or from the dosing unit by a gap.

The dosing unit includes, in particular, a part of a line through which an exhaust-gas aftertreatment agent can be transferred from a tank into the exhaust line for the treatment of the exhaust gas. The dosing unit has, in the direction of the exhaust line, a dosing opening from which the exhaust-gas aftertreatment agent emerges from the dosing unit. The dosing unit is, in particular, constructed in the manner of an injector (which can be actuated in a regulated or targeted manner). The dosing unit is very particularly preferably constructed and set up for the metering of a liquid exhaust-gas aftertreatment agent. In this case, it is preferable for the exhaust-gas aftertreatment agent to be dispensed at the dosing opening (virtually) completely in liquid form. The metering may, if appropriate, also be performed with the assistance of a carrier gas (for example pressurized air), although that is not mandatory for this application.

The dosing unit is surrounded by a cooling jacket. The cooling jacket is formed, in particular, by the outer wall of the dosing unit and by a surrounding cooling jacket wall provided further to the outside, in such a way that a cooling medium can flow through the cooling jacket. The cooling jacket wall is, in particular, connected to the dosing unit through a connection, in such a way that the dosing unit can be fixed in the opening of the exhaust pipe by way of the cooling jacket wall. The fixing is performed, in particular, by using a connection produced by welding. It is, however, also possible for the dosing unit to be connected to the opening of the exhaust pipe by using a connection in the form of a thread.

The connection between the cooling jacket wall and the exhaust pipe is normally subject to a high temperature gradient (between the hot exhaust gas in the exhaust line and the cooling medium in the cooling jacket), so that particularly high material loading of the connection, of the cooling jacket wall and/or of the exhaust pipe can occur in that region. In particular, the connection is separated from the exhaust line by a covering plate. The covering plate extends, in particular, from the exhaust pipe to the dosing unit. The covering plate covers a partial section of the exhaust pipe, in particular an encircling section surrounding the opening. It is thus the case herein that intensive contact between the exhaust pipe and the hot exhaust gas close to the opening with the dosing unit is prevented. In particular, the covering plate serves to form a space which is connected to the exhaust-gas-conducting exhaust line (only) through a (narrow) gap. The space constitutes a form of temperature barrier because the gas situated therein is only a poor heat conductor.

The gap is formed between the covering plate and the cooling jacket or between the covering plate and the dosing unit. In particular, the gap is (to a limited extent) constructed to be permeable to the exhaust gas. The gap is preferably constructed to be so narrow that a zone at least with calmed flow is formed in the space thus formed. It is achieved in this way that the volume of the space is not continuously flowed through or scavenged by the exhaust gas from the exhaust line. The "enclosed" exhaust-gas or air quantity present in the space is consequently predominantly not at the high temperature of the exhaust gas flowing through the exhaust line. In particular, the volume enclosed by the space is heated primarily by heat conduction. The space is preferably connected in terms of flow to the exhaust gas flowing in the exhaust line through the gap. In particular, the gap is accordingly a gap through which the exhaust gas can flow and which is not closed off, for example by using a seal. There is relatively little exchange of exhaust gas between the space and the exhaust line. The space serves to form a heat insulator in such a way that, firstly, the cooling jacket is at least partially separated from the exhaust gas flowing in the exhaust line, and secondly, the connection between the cooling jacket and the exhaust pipe is not exposed to the exhaust gas in the exhaust line. During the operation of the internal combustion engine, the space will generally assume a temperature that lies between the temperature of the cooling medium of the cooling jacket and that of the exhaust gas flowing in the exhaust line. As a result, on average, the temperature gradient in the vicinity of the dosing unit is reduced. Accordingly, the risk of deposits forming on the exhaust pipe, on the cooling jacket or on the covering plate is reduced.

In accordance with another advantageous feature of the invention, the dosing unit has a dosing opening, and the dosing opening and the covering plate terminate flush with one another in the direction of the exhaust line. It is accordingly the case, in particular, that the dosing opening and the covering plate in the region of the dosing opening lie in a common plane, so that a flush termination in the direction of the exhaust line is ensured. The flush termination serves, in particular, to prevent turbulence from forming in the region of the exhaust line, which turbulence could lead to the exhaust-gas aftertreatment agent being flung against the cold surfaces of the dosing unit and/or of the covering plate. An impingement of the exhaust-gas aftertreatment agent against the cold surfaces can cause deposits of exhaust-gas aftertreatment agent to form. Furthermore, due to the reduction of turbulence in that region, it is achieved that there is correspondingly little exchange of air with the volume enclosed in the space, in such a way that, in this way, there are only small pressure differences between the space and the exhaust line. A flush termination between the dosing opening and the covering plate is provided, in particular, if the dosing opening projects beyond the covering plate, or is recessed in relation to the covering plate, in the direction of the exhaust line by at most 1 mm [millimeter]. It is very particularly preferable for the covering plate to be situated at least predominantly in a plane that extends perpendicularly through the dosing opening. It is very particularly preferable if, in the surrounding area outside the covering plate, the exhaust line is also situated in that plane, in such a way that a flow passes over the exhaust line, the covering plate and the dosing opening with relatively little turbulence.

In accordance with a further feature of the invention, the covering plate is connected cohesively to the exhaust pipe. The expression "cohesive" connection refers to all connections in which the connecting partners are held together by atomic or molecular forces. They are, at the same time, non-releasable connections which can be severed only by destruction of the connecting device. A cohesive connection is realized, in particular, by using a welded connection. In particular, the covering plate is connected to the exhaust pipe by using an encircling weld seam. It is preferable for the dosing unit and the cooling jacket, and in particular the connection between the cooling jacket and the opening of the exhaust pipe, to be disposed so as to be separated from the exhaust line by the covering plate.

In accordance with an added advantageous feature of the invention, a cooling medium or the exhaust-gas aftertreatment agent can flow through the cooling jacket of the dosing unit. In this case, water, for example, may be used as a cooling medium. In particular, the cooling of the dosing unit is realized by using the exhaust-gas aftertreatment agent itself. Corresponding connection lines are thus provided for the (regulated) supply and discharge of the cooling medium either to a water circuit or to the line system of the exhaust-gas aftertreatment agent.

In accordance with an additional advantageous feature of the invention, the gap (between the covering plate and the cooling jacket or between the covering plate and the dosing unit) has a width of at least 0.5 mm [millimeters] and of at most 2.5 mm. In this way, in accordance with the construction of the exhaust system, it is firstly possible for an intensive flow of exhaust gas into the space to be prevented, and secondly, it is however also ensured that no heat bridges are formed there (for example due to deposits, soot, etc.).

In accordance with yet another feature of the invention, the dosing opening of the dosing unit extends into the exhaust line at least 2 mm [millimeters] further than the cooling jacket. It is also preferable for the dosing opening to be formed so as to project into the exhaust line by at most 10 mm. In particular, the cooling jacket or the cooling jacket wall is accordingly disposed so as to be set back in relation to the dosing opening and the covering plate. The dosing opening itself is not cooled by the cooling jacket, so that the dosing opening is subject to more intense heating due to the more intensive contact with the exhaust gas flowing in the exhaust line. By virtue of the cooling jacket being disposed so as to be set back in this way in relation to the dosing opening of the dosing unit, the temperature gradient between the surfaces of the dosing unit and the exhaust gas is further reduced, in such a way that the probability of deposits of the exhaust-gas aftertreatment agent forming on cold surfaces of the dosing unit is further reduced. By virtue of the cooling jacket being set back in relation to the dosing opening, and due to the preferably flush configuration of the covering plate and the dosing opening, the gap is formed either between the covering plate and the cooling jacket and/or between the covering plate and the dosing unit.

In accordance with yet a further preferred feature of the invention, the space takes up a volume in a range from 250 mm$^3$ [cubic millimeters] to 5,000 mm$^3$, and in particular in a range from 250 mm$^3$ to 1,500 mm$^3$. In particular, such a volume of the space ensures correspondingly adequate heat insulation.

With the objects of the invention in view, there is concomitantly provided a motor vehicle, comprising at least an internal combustion engine, an exhaust line and a device according to the invention for the aftertreatment of exhaust gas. In this case, the device serves, in particular, for the metering of a liquid reducing agent or reducing agent precursor. The cooling is realized preferably by using a water circuit. The dosing unit is preferably in the form of an (actively controllable) injector. In order to implement the SCR method, at least one suitable catalytic converter, for example a hydrolysis catalytic converter and/or an SCR catalytic converter, is provided in the exhaust line downstream of the dosing unit as viewed in the flow direction. Furthermore, a mixer or a guide plate configuration may be provided in the exhaust line in order to achieve as complete as possible a distribution of the exhaust-gas aftertreatment agent in the exhaust line before it reaches the catalytic converters.

Other features which are considered as characteristic for the invention are set forth in the appended claims, noting that the features specified individually in the claims may be combined with one another in any desired technologically meaningful way and may be supplemented by explanatory facts from the description, with further structural variants of the invention being specified.

Although the invention is illustrated and described herein as embodied in a device for exhaust-gas aftertreatment having a dosing unit for an exhaust-gas aftertreatment agent and a motor vehicle having the device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 2 is a fragmentary, diagrammatic, cross-sectional view of another exemplary embodiment of the device; and FIG. 3 is a fragmentary, cross-sectional view of a further exemplary embodiment of the device.

DETAILED DESCRIPTION OF THE INVENTION

Figure 1:
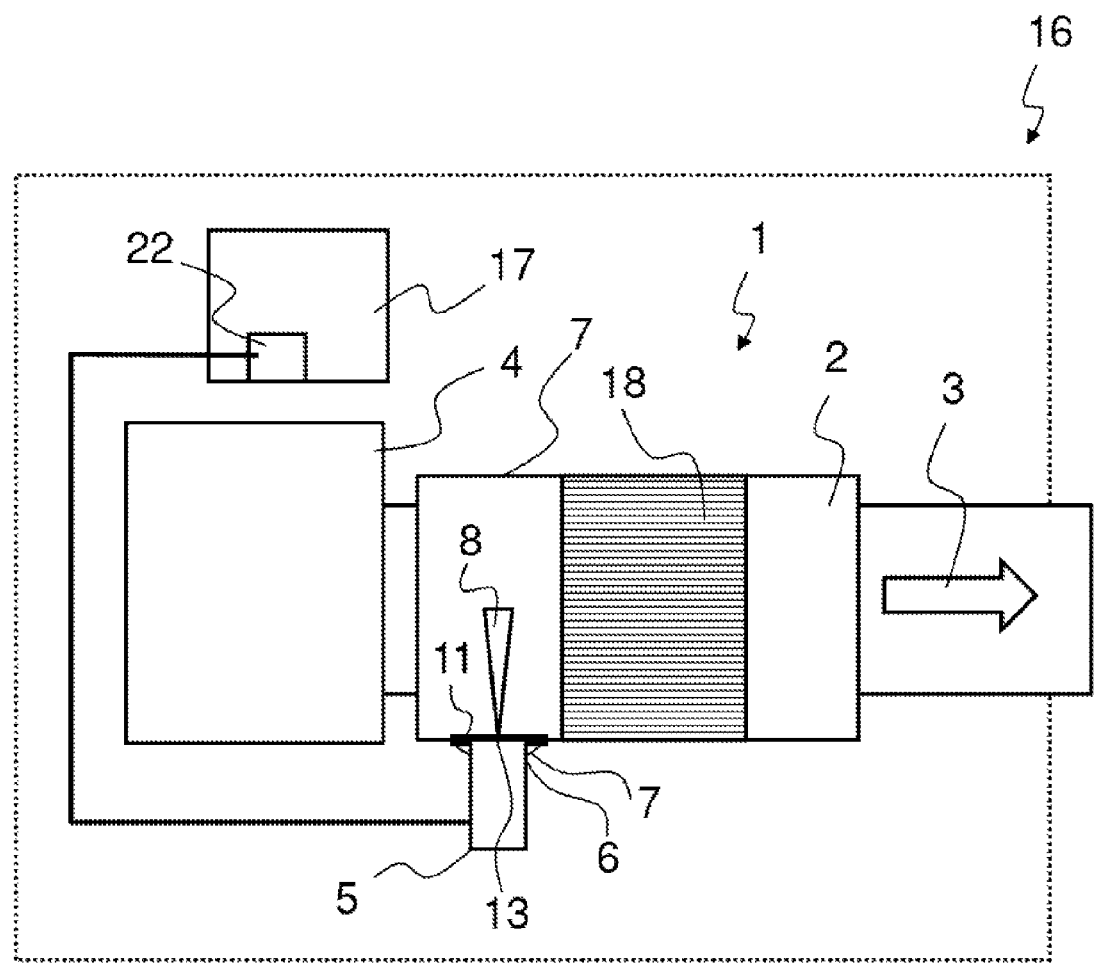
FIG. 1 is a block diagram of a motor vehicle having a device according to the invention.

Referring now in detail to the figures of the drawing for explaining the invention and the technical field in more detail by showing particularly preferred structural variants to which the invention is not restricted and in which proportions are diagrammatic and the same reference numerals are used for identical objects, and first, particularly, to FIG. 1 thereof, there is seen a motor vehicle 16 having an internal combustion engine 4, an exhaust line 2 and a device 1. An exhaust gas 3 proceeding from the internal combustion engine 4 flows through the exhaust line 2. An exhaust-gas aftertreatment unit 18 (for example an SCR catalytic converter) is provided in the exhaust line 2. In this case a dosing unit 5 is disposed in an opening 6 of an exhaust pipe 7, upstream of the exhaust gas aftertreatment unit 18. In this case, the exhaust pipe 7, a covering plate 11 and a dosing opening 13 of the dosing unit 5 terminate flush with one another (that is they lie substantially in a common plane in the surrounding area). An exhaust-gas aftertreatment agent 8 is introduced into the exhaust line 2 by using the dosing unit 5. The dosing unit 5 is connected in terms of flow to a tank 17 for the exhaust-gas aftertreatment agent 8. A pump 22 delivers the exhaust-gas aftertreatment agent 8 from the tank 17 to the dosing unit 5.

FIG. 2 shows a first exemplary embodiment of the device 1. An exhaust gas 3 flows through the exhaust line 2. In a region of the exhaust line 2, an opening 6 is provided in the exhaust pipe 7 of the exhaust line 2. A dosing unit 5 extends through the opening 6. The dosing unit 5 is surrounded by a cooling jacket 9, permitting a cooling medium 15 to circulate in the cooling jacket 9 between the dosing unit 5 and a cooling jacket wall 19. The exhaust pipe 7 is connected to the cooling jacket 9 or to the cooling jacket wall 19 by a connection 20. The connection 20 prevents an escape of the exhaust gas 3 from the exhaust line 2. The device 1 furthermore has the covering plate 11 which is connected to the exhaust pipe 7 by a connection 20. The covering plate 11 extends from the exhaust pipe 7 toward the dosing unit 5 or toward the cooling jacket 9. In the region of the dosing unit 5, the covering plate 11 terminates flush with the dosing opening 13 of the dosing unit 5. Furthermore, the covering plate 11 forms a gap 12, with a width 14, between the covering plate 11 and the cooling jacket 9. The covering plate 11, the cooling jacket 9 (or the cooling jacket wall 19) and the exhaust pipe 7 correspondingly form a space or chamber 10 which is connected in terms of flow through the gap 12 to the exhaust line 2. The space 10 has a volume 21 which is heated primarily by heat conduction. An exchange of exhaust gas 3 (or air) present in the space 10 with the exhaust gas 3 in the exhaust line 2 takes place only through the gap 12. The exhaust gas 3 (or air) present in the volume 21 is thus heated only to a small extent due to the exchange of exhaust gas 3 (or air). An exhaust-gas aftertreatment agent 8 is introduced through the dosing opening 13 into the exhaust line 2 by using the dosing unit 5.

FIG. 3 shows a further exemplary embodiment of the device 1. Reference is made herein to the corresponding explanations given above, where the illustration corresponds to FIG. 2. In this case, in contrast to FIG. 2, the cooling jacket 9 is disposed so as to be set back in relation to the dosing opening 13. The gap 12 having the width 14 is correspondingly formed between the covering plate 11 and the dosing unit 5. The space 10 is correspondingly formed by the covering plate 11, the exhaust pipe 7, the cooling jacket 9 (or cooling jacket wall 19) and the dosing unit 5. In the region of the dosing unit 5, the covering plate 11 terminates flush with the dosing opening 13 of the dosing unit 5. The tip of the dosing unit 5 is thus not cooled as intensely as in the first exemplary embodiment. Deposits of residues of the exhaust-gas aftertreatment agent 8 thus form to a lesser extent because the temperature gradient between the dosing unit 5 and the exhaust gas 3 in the exhaust line 2 is smaller.

In summary, it can be stated that the invention has solved the technical problems highlighted in conjunction with the prior art. In particular, an especially inexpensive, technically simple and effective device through the use of which the temperature loading of the connection between the exhaust line and the dosing unit can be reduced, and/or deposits of the exhaust-gas aftertreatment agent can be prevented from forming in the region of the dosing unit, has been specified.

The invention claimed is:

1. A device for the aftertreatment of an exhaust gas from an internal combustion engine, the device comprising:
   an exhaust line through which the exhaust gas flows from the internal combustion engine, said exhaust line having an exhaust pipe with an opening formed therein;
   a doser disposed in said opening and configured to meter an exhaust-gas aftertreatment agent into said exhaust line;
   a cooling jacket surrounding said doser and fixing said doser in said opening, said cooling jacket having a cooling jacket wall directly connected to said exhaust pipe; and
   a covering plate connected to said exhaust pipe and spaced apart from said cooling jacket or from said doser by a gap, said covering plate extending from said exhaust pipe to said doser and covering an encircling section of said exhaust pipe surrounding said opening;
   at least said cooling jacket, said exhaust pipe and said covering plate delimiting a space at least partially surrounding said cooling jacket, said space completely surrounding said doser without contacting said doser.

2. The device according to claim 1, wherein said doser has a dosing opening, and said dosing opening and said covering plate terminate flush with one another in the direction of said exhaust line.

3. The device according to claim 1, wherein said covering plate is cohesively connected to said exhaust pipe.

4. The device according to claim 1, wherein said cooling jacket of said doser is configured to conduct a flow of a cooling medium or of the exhaust-gas aftertreatment agent.

5. The device according to claim 1, wherein said doser has a dosing opening, and said dosing opening extends into said exhaust line at least 2 mm [millimeters] further than said cooling jacket.

6. A motor vehicle, comprising:
   an internal combustion engine;
   an exhaust line connected to said internal combustion engine; and
   the device according to claim 1 for the aftertreatment of an exhaust gas in said exhaust line.

7. The device according to claim 1, wherein said gap has a width of at least 0.5 mm [millimeters] and of at most 2.5 mm.

8. The device according to claim 1, wherein said space has a volume in a range from 250 $mm^3$ [cubic millimeters] to 5000 $mm^3$.

* * * * *